United States Patent [19]
Chin et al.

[11] Patent Number: 6,119,812
[45] Date of Patent: Sep. 19, 2000

[54] COLLAPSIBLE SURF STAND

[76] Inventors: Harvey Chin, 58 Kingston Ave., Hicksville, N.Y. 11801; Michael Steneck, 35 Bogel Rd., Bayport, N.Y. 11705

[21] Appl. No.: 09/270,245
[22] Filed: Mar. 15, 1999
[51] Int. Cl.[7] .................................................. A01M 31/00
[52] U.S. Cl. ........................... 182/223; 382/115; 382/152
[58] Field of Search ..................................... 182/131–132, 182/222, 223, 179.1, 130, 152, 115

[56] References Cited

U.S. PATENT DOCUMENTS

| | | | |
|---|---|---|---|
| 2,758,379 | 8/1956 | Senk | 182/107 |
| 2,782,075 | 2/1957 | Fagan | 182/152 |
| 3,116,808 | 1/1964 | Riley | 182/132 |
| 4,907,673 | 3/1990 | Ginter | 182/81 |
| 5,029,671 | 7/1991 | Carson | 182/223 |
| 5,246,085 | 9/1993 | Liegel | 182/223 |
| 5,339,922 | 8/1994 | Beechler | 182/223 |
| 5,697,180 | 12/1997 | Morizio . | |

*Primary Examiner*—Alvin Chin-Shue
*Attorney, Agent, or Firm*—Michael I. Knoll

[57] ABSTRACT

A collapsible surf stand comprising a foldable platform for supporting the weight of a person standing on the platform when in an opened position. A plurality of foldable and extendable leg members are on underside of the platform. A carrying means is on the platform for carrying the platform when the leg members are folded to non-operative positions and the platform is in a closed position.

12 Claims, 12 Drawing Sheets

COLLAPSIBLE SURF STAND

BACKGROUND OF THE INVENTION

1. Field of the Invention

The present invention relates generally to sportsman's seats and, more specifically, to a collapsible surf stand having a grate platform which can be coated with a rubber material to provide a non-slip surface and having two oppositely opposed centrally positioned apertures in said grate, with or without rubber grommets contained therein, for the purposes of inserting fishing rod holders or stanchions for resting shotgun, rifle or bow and arrows, and having four corner positioned threaded apertures for inserting poles having camouflage material attached thereon. An access panel of the platform is hinged, so that the access panel can be opened allowing use of a set of stairs for the purposes of mounting and dismounting from the platform. The platform has a number of attached folding and unfolding leg members. Each leg member has a retractable and extendable portion contained therein allowing height adjustments as well as the capability of leveling the collapsible stand on uneven ground. A pin is for fixing the extendable portion of the leg member to a selected position. Each extendable leg member has a tapered spike end providing anchoring means for the collapsible surf stand. A foldable chair member attached to the underside of the platform is selectively extendable to an operative position on the top of the platform. Further, the collapsible stand has a hinge located across the middle of the platform. When the chair member, set of stairs and leg members are retracted and folded to their non-operative positions the collapsible surf stand can be folded in half. Backpack straps are located across the front and a handle is located on one side, so that the collapsible surf stand can be carried by either means while in the folded condition.

In general, a first field of use of the disclosed invention is by surf fishermen as the most likely benefactors of the unique advantages of the instant invention. However, many other fields, such as fly fisherman, deer hunters and water fowl hunters in marshes, could find potentially beneficial uses of this invention.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is, therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

2. Description of the Prior Art

Numerous types of sportsman's seats have been provided in the prior art. For example, U.S. Pat. Nos. 3,067,975; 4,148,376; 4,998,599 and 5,009,283 all are illustrative of such prior art. While these units may be suitable for the particular purpose to which they address, they would not be as suitable for the purposes of the present invention as heretofore described.

U.S. Pat. No. 3,067,975

Inventor: Rollo L. Wilcox

Issued: Dec. 11, 1962

A sportsman's seat comprising, in combination, a seat structure which includes a frame. The frame comprises front, rear and side members, means for securing the rear member on a support, legs for supporting the front portion of the frame, and means for pivotally connecting the legs to the side members to be swung substantially into parallelism therewith to an inoperative position. The last named means comprising hinges includes generally L-shaped straps affixed to the upper portions of the legs on opposite sides thereof. The straps straddle the side members and are pivotally secured thereto. The hinged ends of the legs are engageable beneath the side members for arresting the legs when swung to an operative position and for positively supporting the frame and directly receiving the weight of a load thereon. The first-named means includes a resilient, horizontal bar having its intermediate portion affixed to the rear member with its end portions free thereof. A flexible strand is adapted to be wrapped around the support and is connected to the ends of the resilient bar for bending the same around the support. The present invention is completely different than this patent, in that it consists of a combination backpack, hunting chair and stand, as well as a portable hunting seat.

U.S. Pat. No. 4,148,376

Inventor: Carl C. Campbell Jr.

Issued: Apr. 10, 1979

The present invention relates to a multipurpose apparatus that may be used, for example, as a tree stand or backpack frame or the like. Structurally, the apparatus comprises a main frame structure having a seat pivotably mounted about one area thereof and a back area provided above the seat within the main frame structure. Straps are provided about the main frame structure for enabling the apparatus to be strapped about a tree or other structure, or to be utilized as shoulder straps for supporting the apparatus about an individual when the apparatus is used as a backpack frame. The present invention is completely different than this patent, in that it consists of a combination backpack, hunting chair and stand as well as a portable hunting seat.

U.S. Pat. No. 4,998,599

Inventor: Tzann D. Wang

Issued: Mar. 12, 1991

A foldable ladder including a foldable support frame mechanism and a head step assembly releasably mounted to the support frame mechanism. The head step assembly comprises a pair of base plates each having protuberances on both sides thereof and a number of step plates each having holes complementary in shape to the protuberances on the base plate. Two step plates and one base plate can be stacked together side by side through protuberance and hole engagement to form a bundle which can be stored within the support frame mechanism in its folded position. The present invention is completely different than this patent, in that it consists of a combination backpack, hunting chair and stand as well as a portable hunting seat.

U.S. Pat. No. 5,009,283

Inventor: Leonard W. Prejean

Issued: Apr. 23, 1991

A versatile hunting stand is provided which may be supported by a tree, ladder or tripod. The stand has a collapsible seat assembly which serves as a foot bar when used as a climbing stand. Adjustable arms may be used as a component of the climbing bar assembly or when a ladder is connected to the front of the stand, the arms may be used to brace the ladder. Instead of supporting the back end of the stand against a tree, tripod legs may be inserted into sockets in the stand. The present invention is completely different than this patent, in that it consists of a combination backpack, hunting chair and stand as well as a portable hunting seat.

None of the above inventions and patents, taken either singly or in combination, is seen to describe the instant invention as claimed.

SUMMARY OF THE PRESENT INVENTION

The present invention relates generally to sportsman's seats and, more specifically, to a collapsible surf stand. The collapsible surf stand contains a platform which is a lightweight grid of a metal alloy or plastic composite having a rubber upper coating providing a non-slip surface which can be used to stand on especially in sandy/rocky shorelines and fresh water streams. The collapsible surf stand has two oppositely opposed centrally located apertures in the platform for inserting various types of folders or stanchions and four corner positioned apertures for inserting threaded poles having attached camouflage material. The collapsible surf stand has a selectively foldable and extendable chair member. An access panel provides access to foldable and extendable steps for mounting and dismounting from the platform. Foldable and extendable leg members each have a retractable and extendable portion contained within a cavity, which can be individually extended to a predetermined position and fixed with a pin to hold it in position. The extendable portion is tapered with a spike end providing anchoring means for the collapsible surf stand. The collapsible surf stand also has a hinge located across the middle of the platform whereby the platform can be folded in half. The platform has backpack straps and a handle, so that it can be carried by either means.

A primary object of the present invention is to provide a collapsible surf stand that will overcome the shortcomings of prior art devices.

Another object of the present invention is to provide a collapsible surf stand which can be used for surf fishing, fly fishing, water fowl hunting in marshes or as a hunting stand.

An additional object of the present invention is to provide a collapsible surf stand which is lightweight, foldable and can be carried with a backpack.

Yet another object of the present invention is to provide a collapsible surf stand with a hinged access panel to use a set of stairs for mounting thereto and dismounting therefrom.

Another object of the present invention is to provide a collapsible surf stand having a plurality of apertures on the platform providing means for inserting fishing rod holders, stanchions for weapon rests, and/or attaching camouflage screening.

Still yet another object of the present invention is to provide a collapsible surf stand with foldable leg members having extendable and retractable portions therein being tapered to a spike-like end on one distal end for securement to soil while in use.

A still further object of the present invention is to provide a collapsible surf stand with foldable leg members having selectively extendable and retractable portions therein providing leveling means therefor.

A further object of the present invention is to provide a collapsible surf stand that is simple and easy to use.

A still further object of the present invention is to provide a collapsible surf stand that is economical to manufacture.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the collapsible surf stand of the present invention. With regard to the reference numerals used, the following numbering is used throughout the various drawing figures.

10 collapsible surf stand
12 foldable platform 14 leg member
16 carrying means
18 grate
20 rubber material
22 lightweight material
24 leg portion
26 cavity in leg member
28 aperture in leg member
30 aperture in leg portion
32 pin
34 tapered spike end of leg portion
36 access panel
38 hinge of access panel
40 set of stairs
42 foldable chair member
44 hinge on platform
46 backpack strap for carrying means
48 handle for carrying means
50 removable and height adjustable rifle holder
52 removable fishing rod holder
54 removable camouflage assembly

DETAILED DESCRIPTION OF THE PREFERRED EMBODIMENT

Turning now descriptively to the drawings, in which similar reference characters denote similar elements throughout the several views, FIGS. 1 through 9 illustrate the various components of the present invention being a collapsible surf stand 10 comprising a foldable platform 12 for supporting the weight of a person standing on platform 12 when in an opened position. A plurality of foldable and extendable leg members 14 are on underside of platform 12. A carrying means 16 is on platform 12 for carrying platform 12 when leg members 14 are folded to non-operative positions and platform 12 is in a closed position.

Platform 12 includes a grate 18 coated with a rubber material 20 to provide a non-slip surface which can be used to stand on, especially in sandy/rocky shorelines and fresh water streams. Platform 12 is fabricated out of a lightweight material 22, such as aluminum or plastic. Each leg member 14 contains a retractable and extendable leg portion 24 contained within a cavity 26, allowing height adjustments as well as the capability of leveling platform 12 on uneven ground. Each leg member 15 has a plurality of longitudinally spaced apart apertures 26. Each leg portion 24 has a plurality of longitudinally spaced apart apertures 30. A pin 32 extends through one aperture 28 in each leg member 14 and through one aperture 30 in each leg portion 24 for fixing each leg portion 24 of each leg member 14 to a selected position. Each leg portion 24 comprises a tapered spike end 34 to provide an anchoring means for leg member 14.

Platform 12 includes an access panel 36 hinged at 38 thereto. A set of stairs 40 are pivotally connected to underside of platform 12 at access panel 36. When access panel 36 is opened the set of stairs 40 can be lowered and used for the purposes of mounting and dismounting from platform 12. A foldable chair member 42 is attached to the underside of platform 12 which is selectively extendable to an operative position onto top of platform 12.

Figure 1:
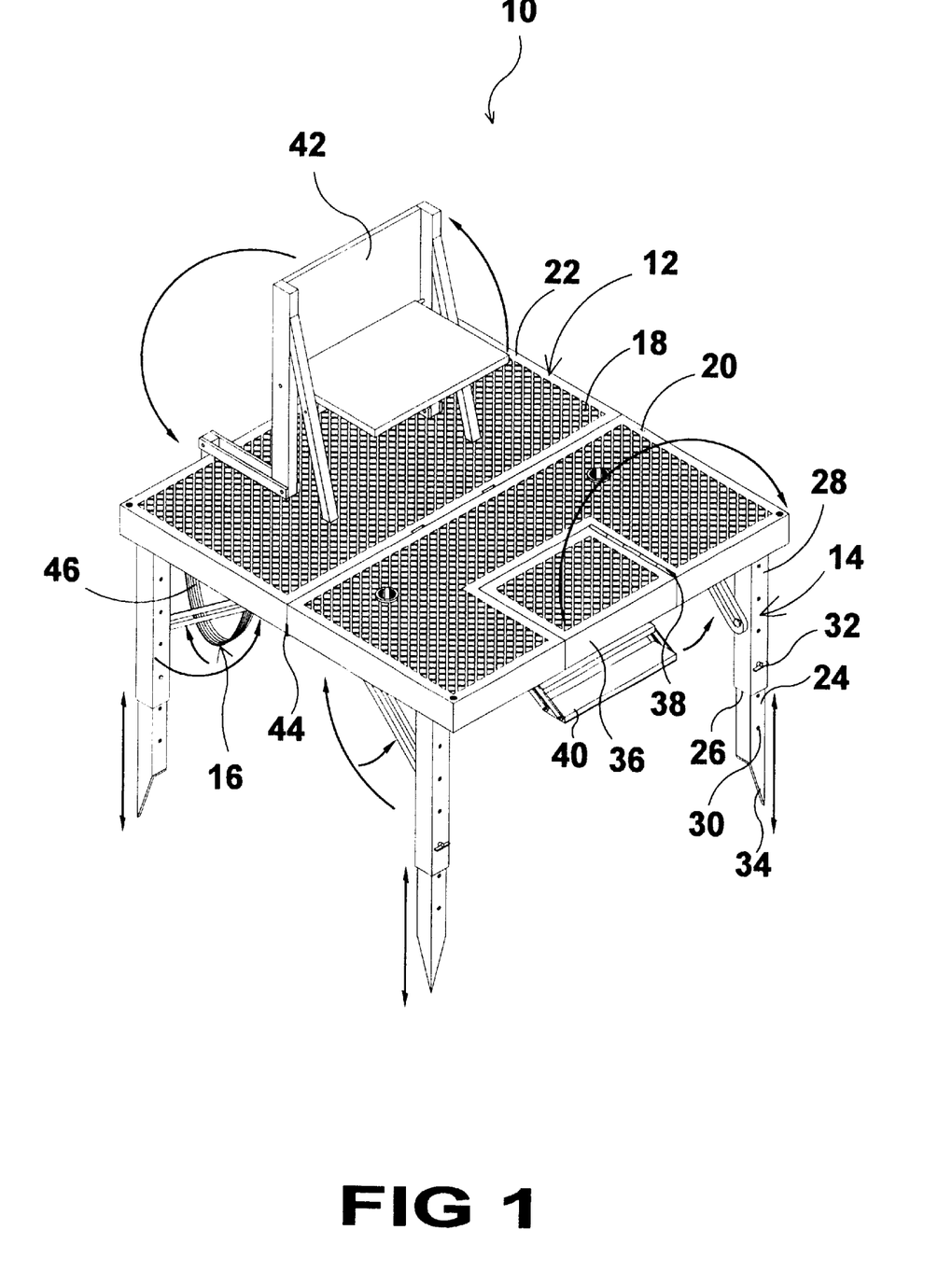
FIG. 1 is a perspective view of the present invention in an opened position, showing the chair member unfolded and extended onto the top of the platform.
Figure 1A:
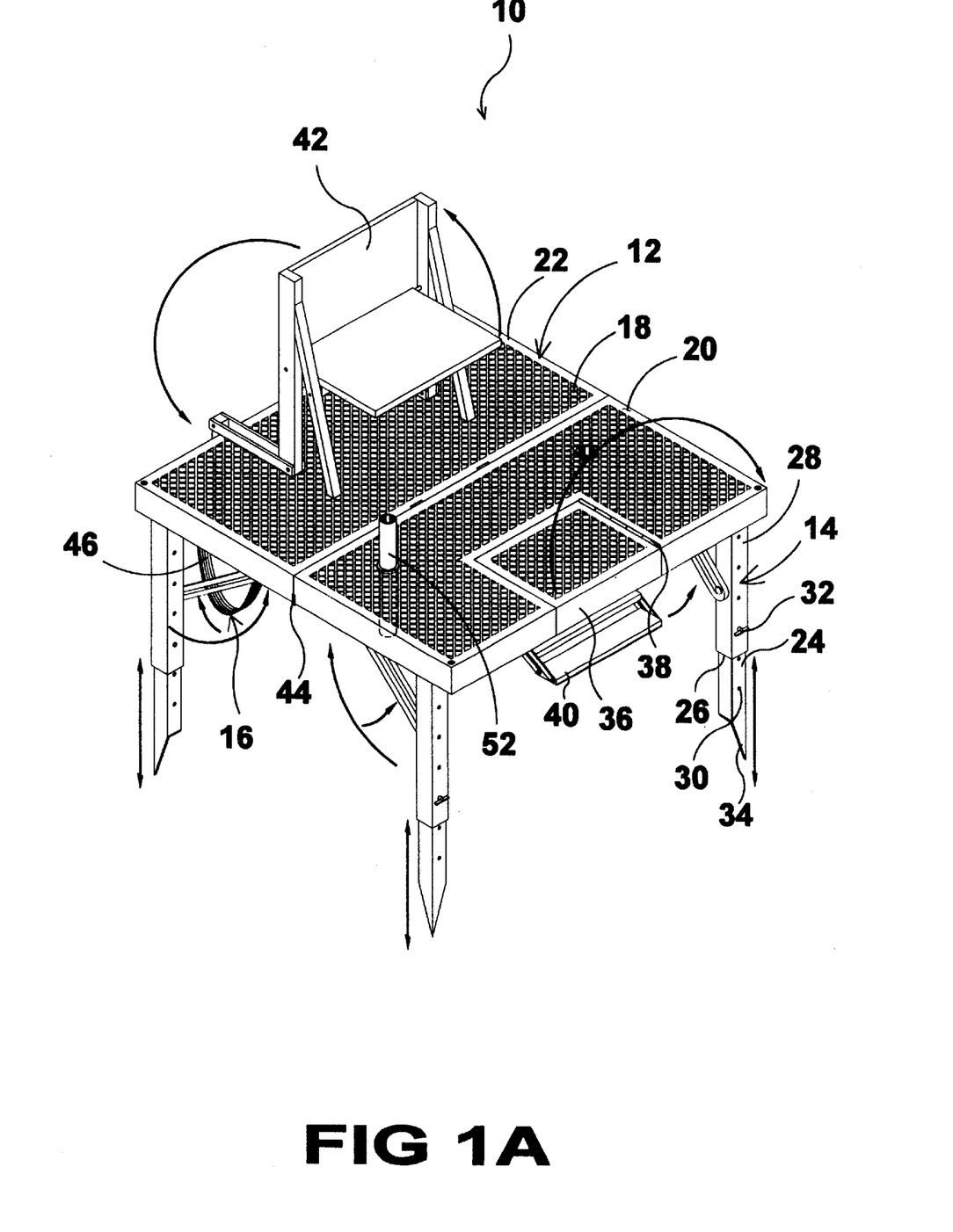
FIG. 1A is a perspective view similar to FIG. 1, showing a removable fishing rod holder mounted onto the top of the platform.
Figure 1B:
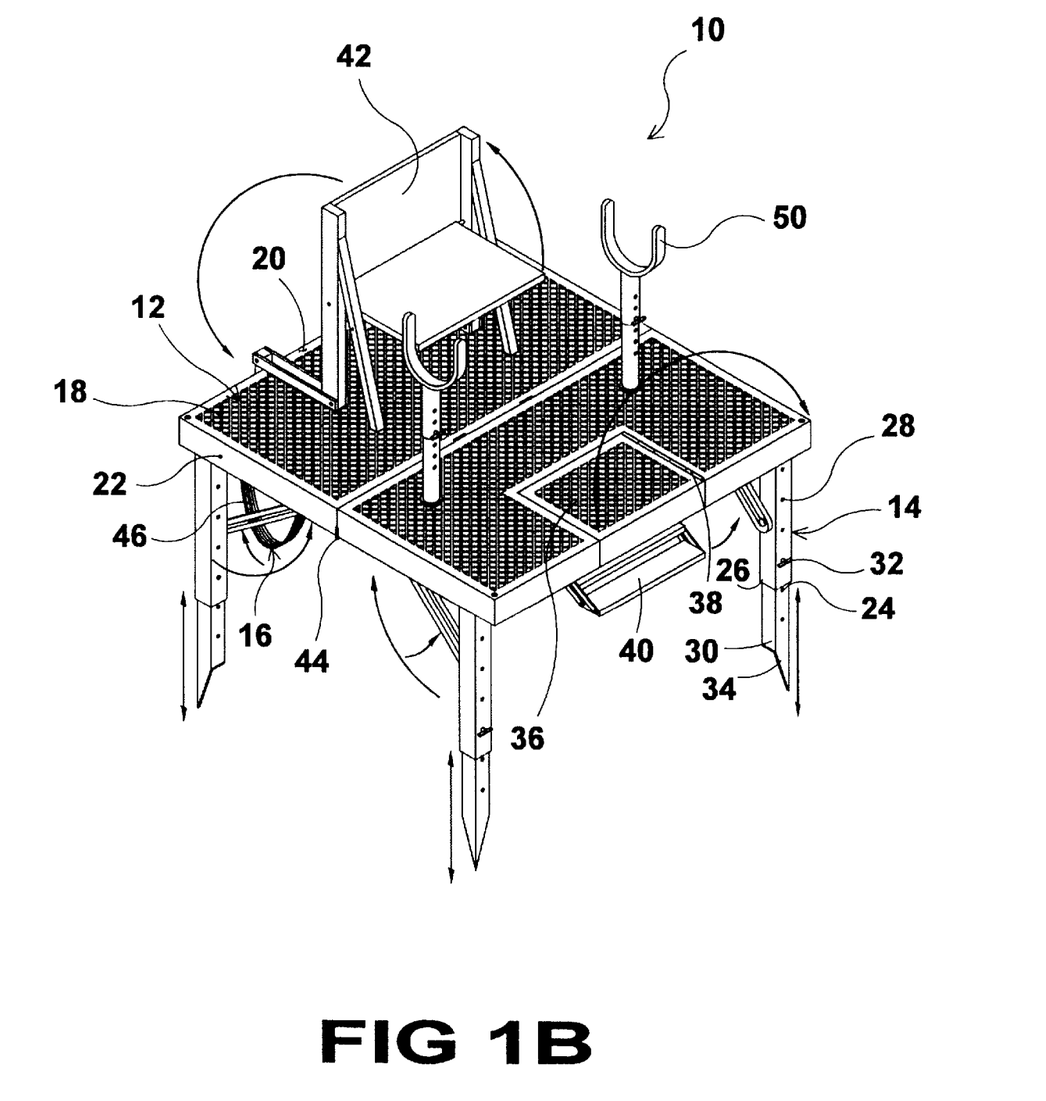
FIG. 1B is a perspective view similar to FIG. 1, showing a removable and height adjustable rifle holder mounted onto the top of the platform.
Figure 1C:
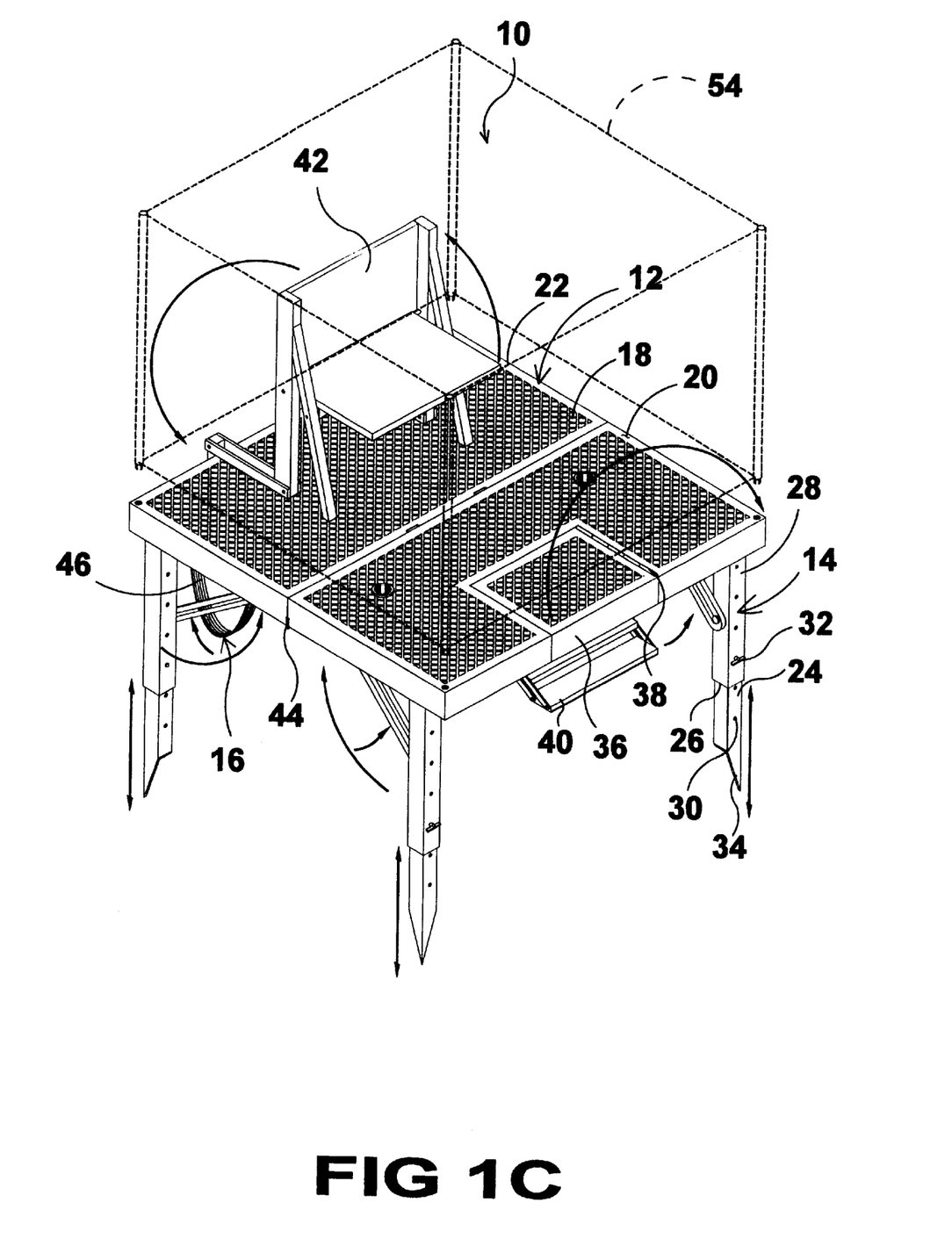
FIG. 1C is a perspective view similar to FIG. 1, showing in outline a number of removable threaded poles mounted onto the top of the platform having camouflage material attached thereto.
Figure 2:
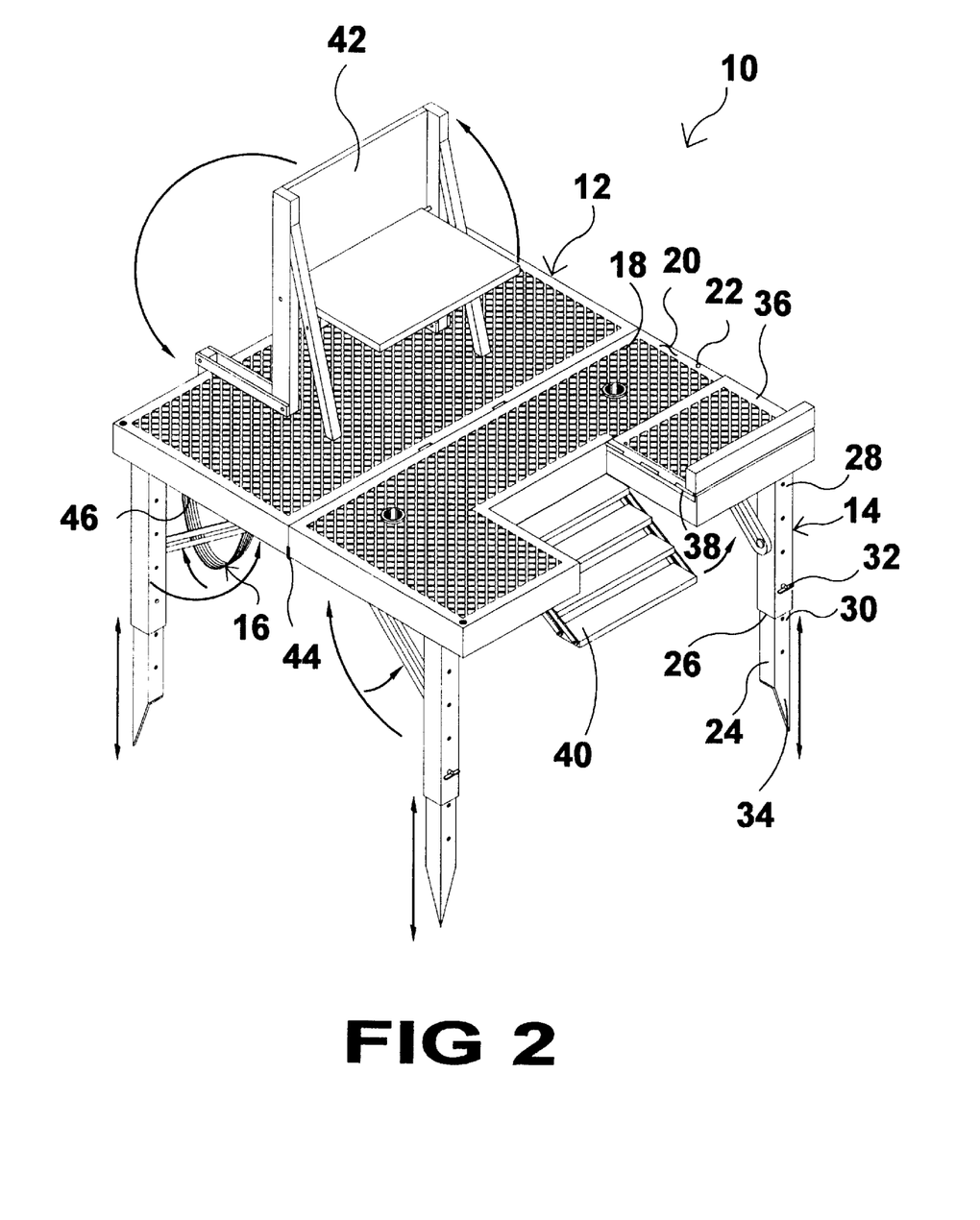
FIG. 2 is a perspective view similar to FIG. 1, showing the access panel of the platform in the opened position providing access to the foldable and extendable set of stairs.
Figure 3:
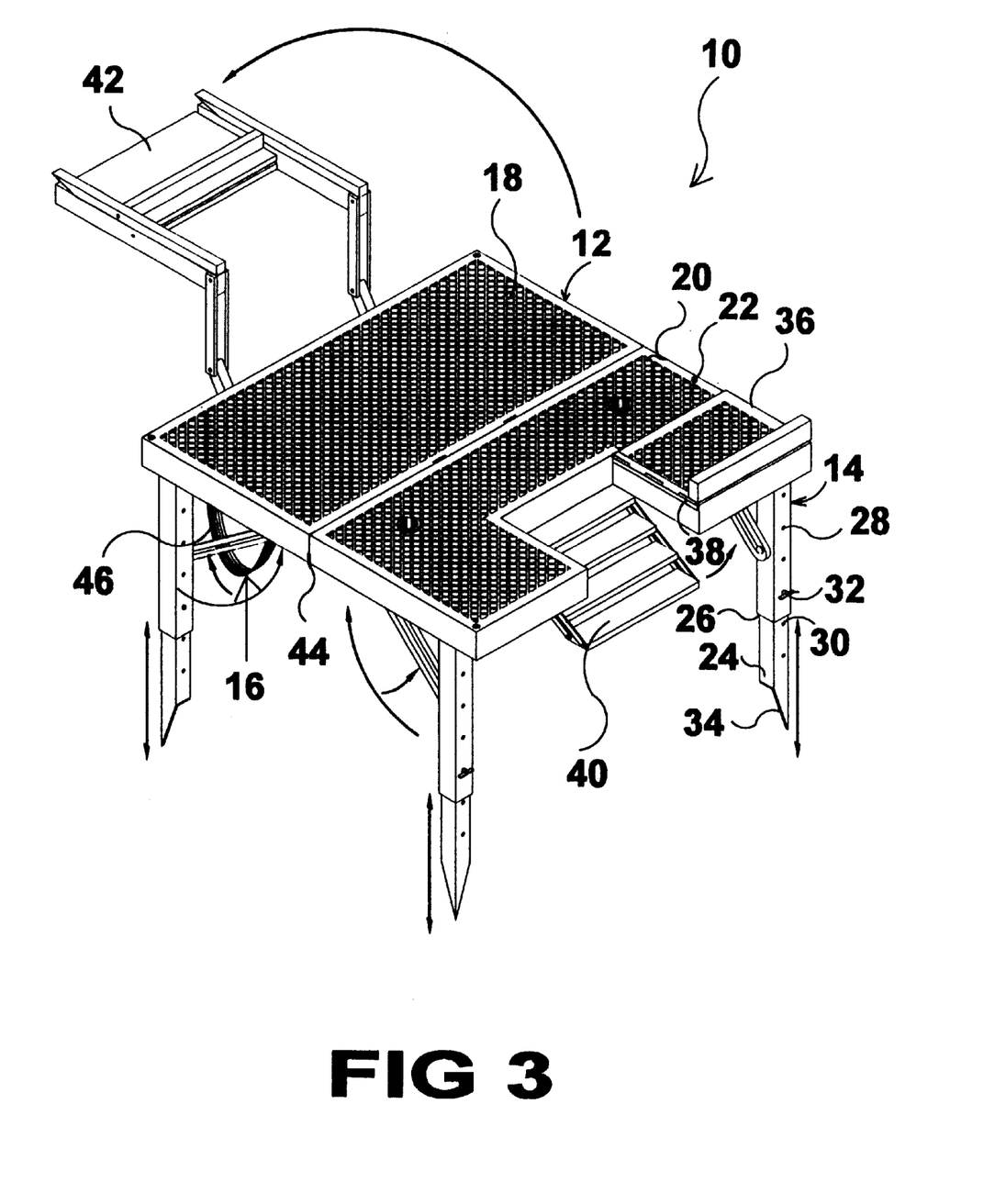
FIG. 3 is a perspective view similar to FIG. 2, showing the chair member in the partially folded position.
Figure 4:
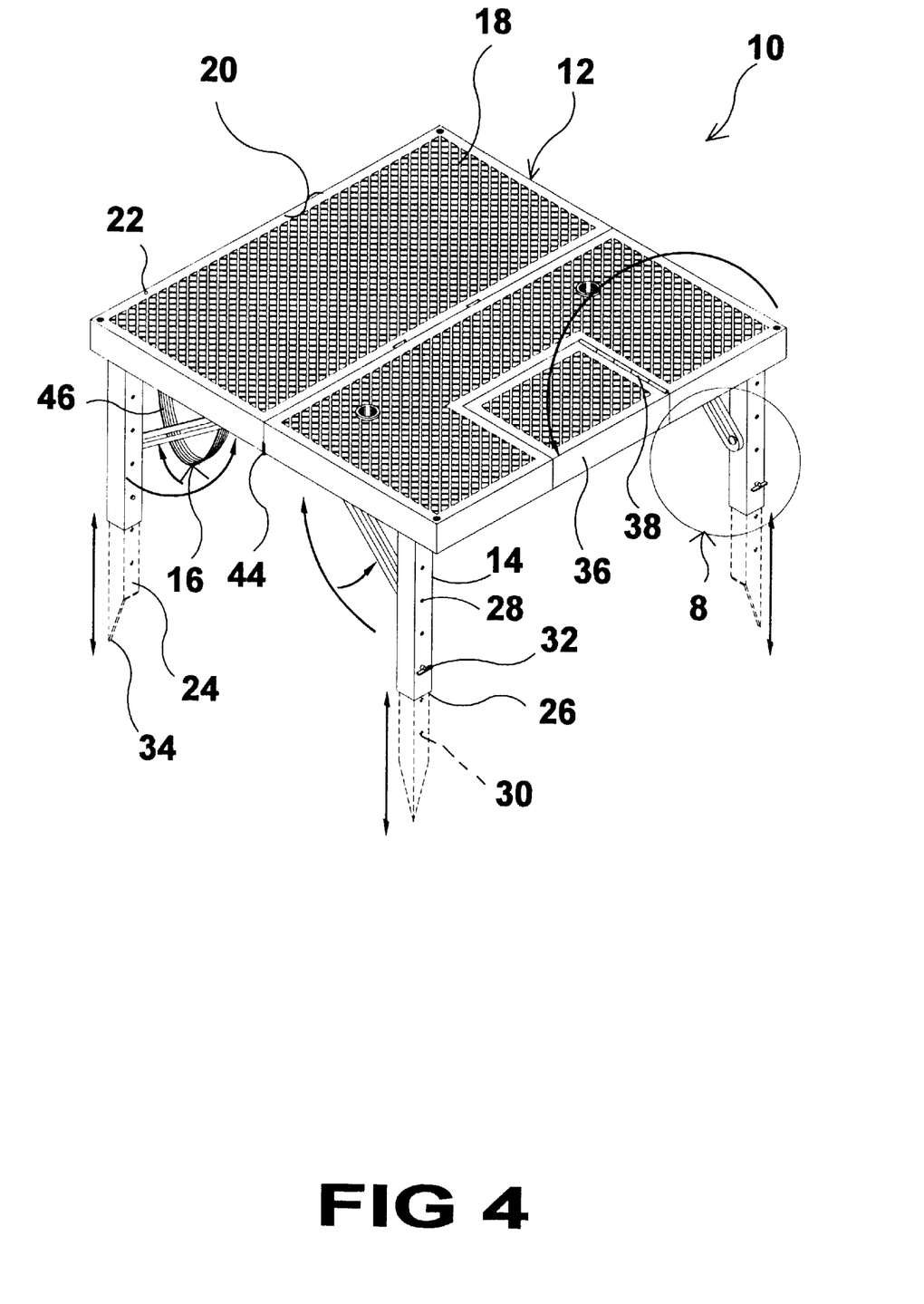
FIG. 4 is a perspective view similar to FIG. 1, showing the chair member and the set of stairs in the folded position.
Figure 5:
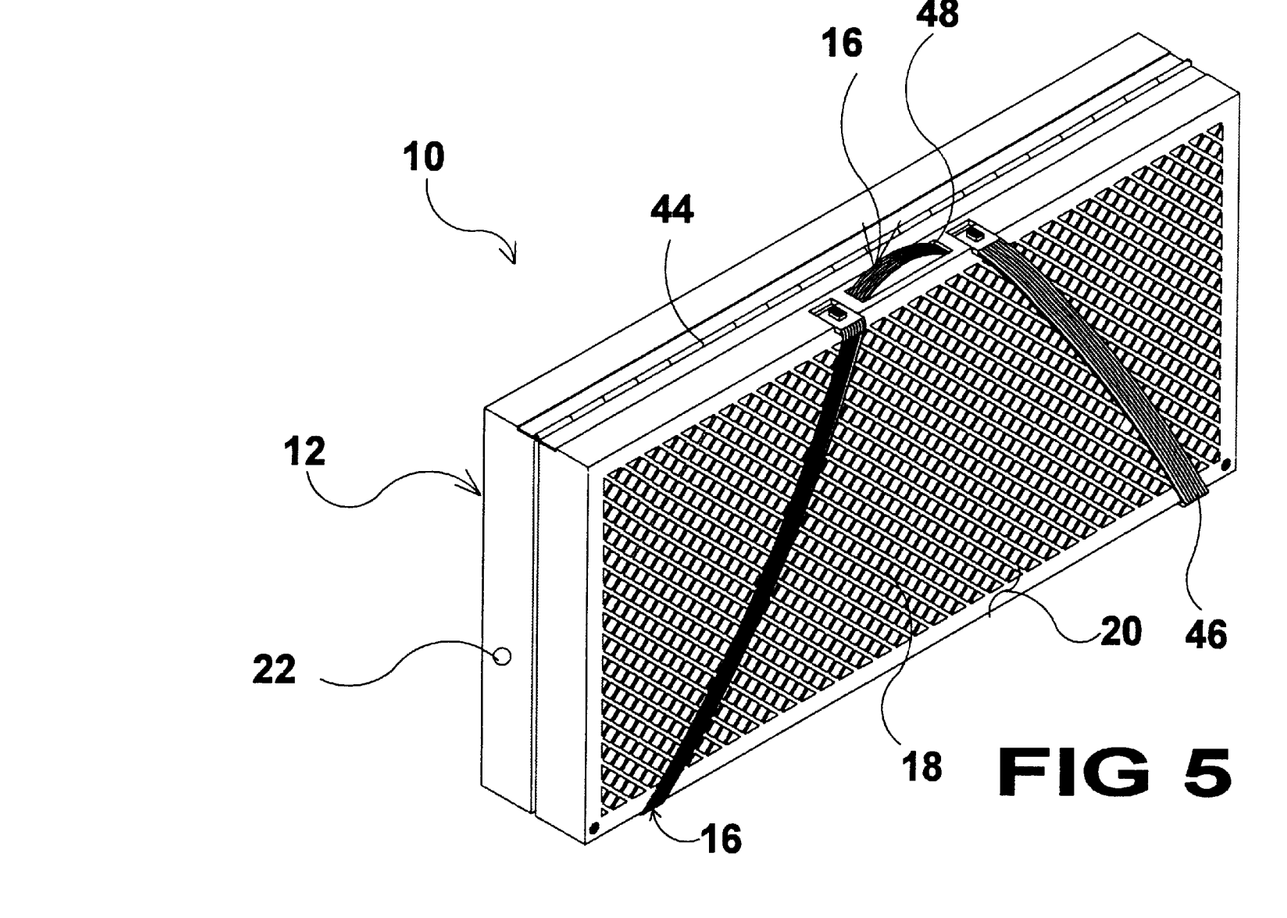
FIG. 5 is a perspective view of the present invention in a closed position having a pair of backpack straps and handle to provide alternate means for carrying.
Figure 6:
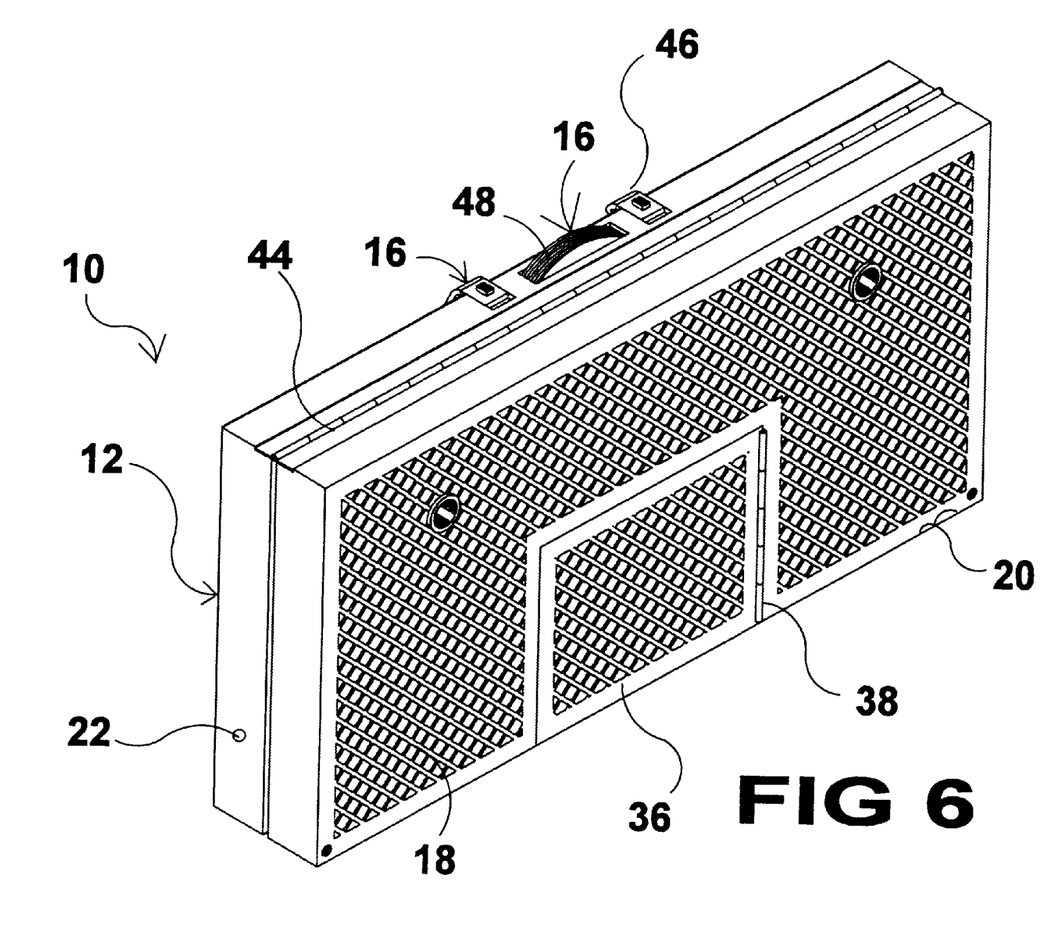
FIG. 6 is a perspective view similar to FIG. 5, shown from the opposite side.
Figure 7:
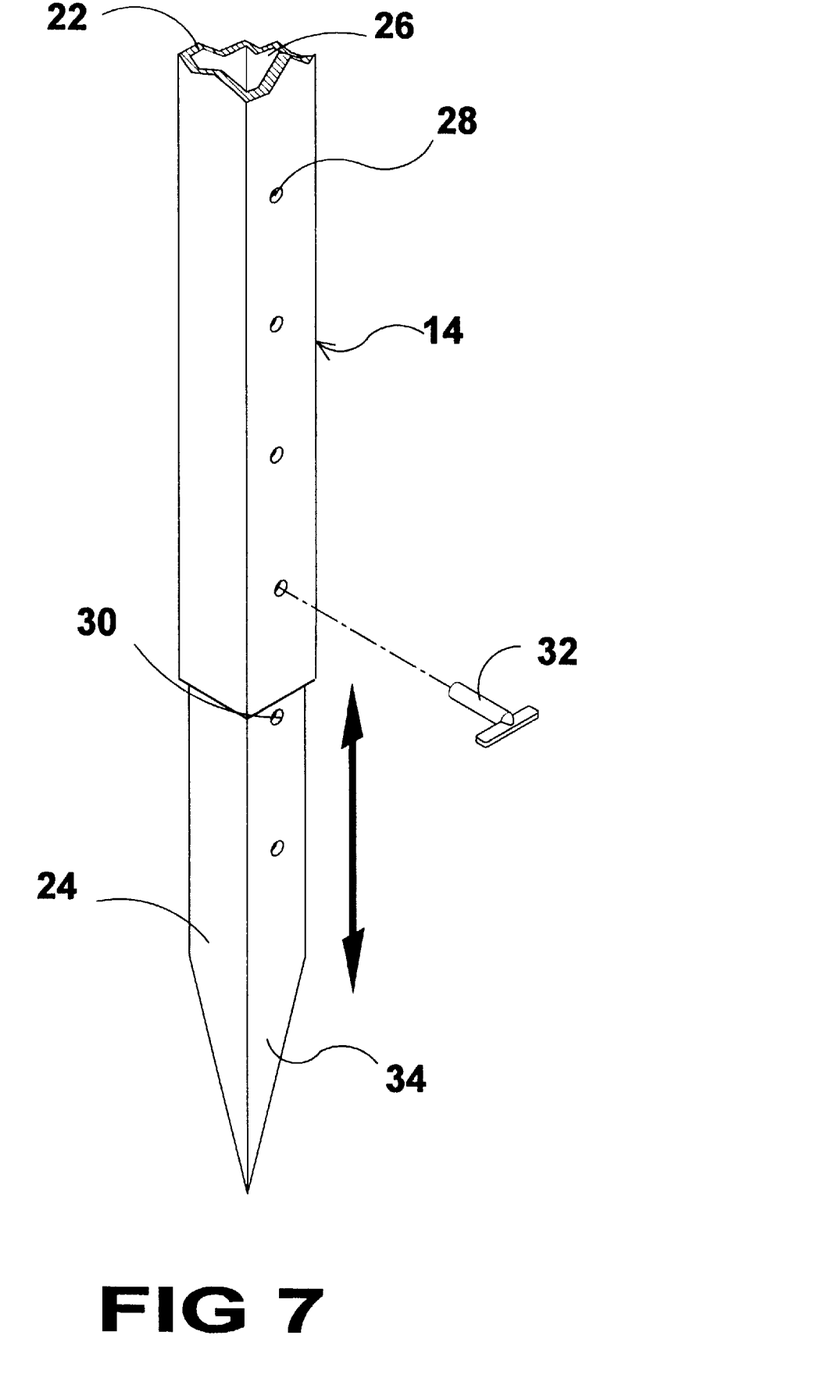
FIG. 7 is an enlarged perspective view of a portion of one leg member as indicated by arrow 7 in FIG. 1.
Figure 8:
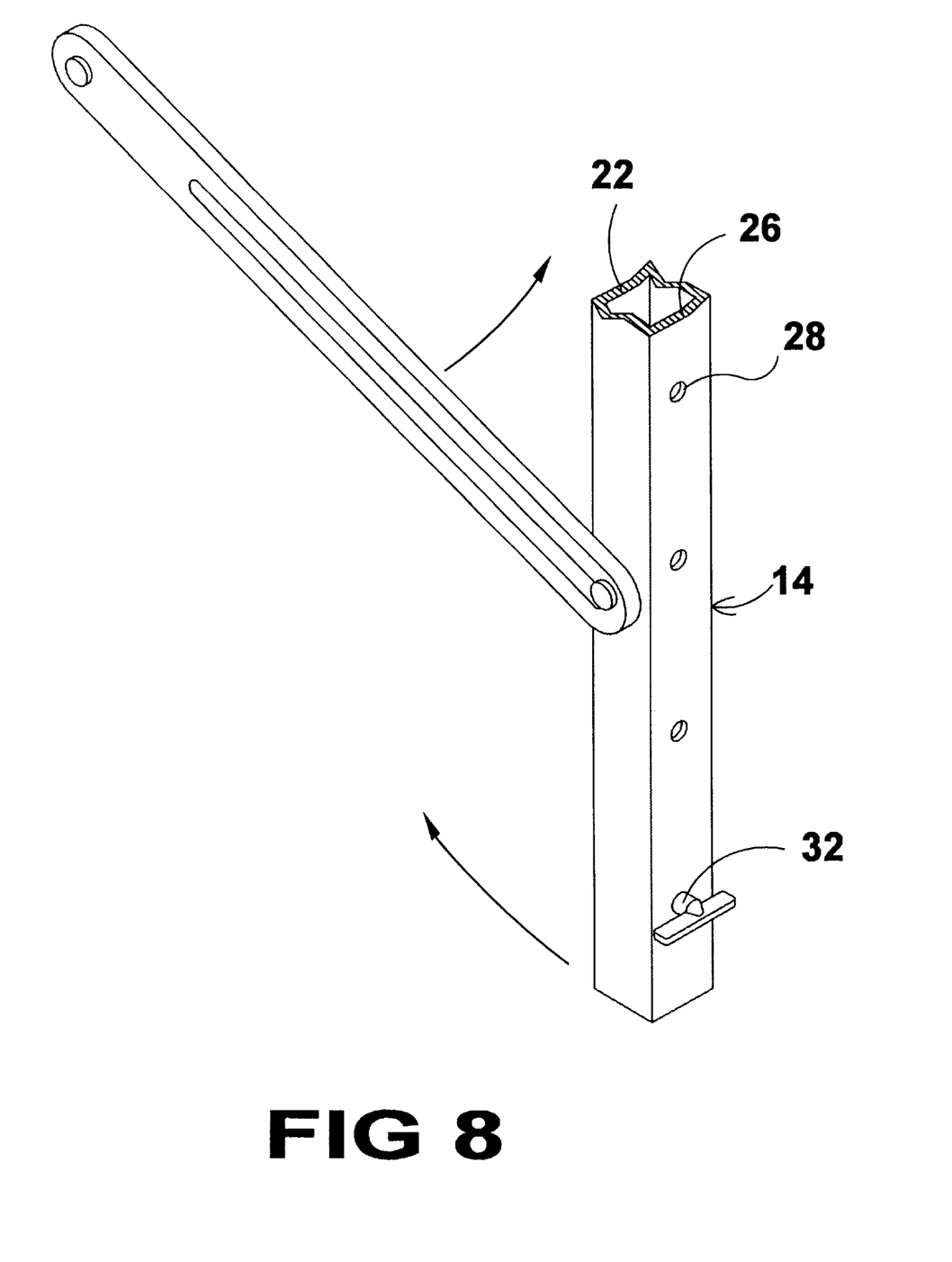
FIG. 8 is an enlarged perspective view of a portion of one leg member as indicated by arrow 8 in FIG. 4.
Figure 9:
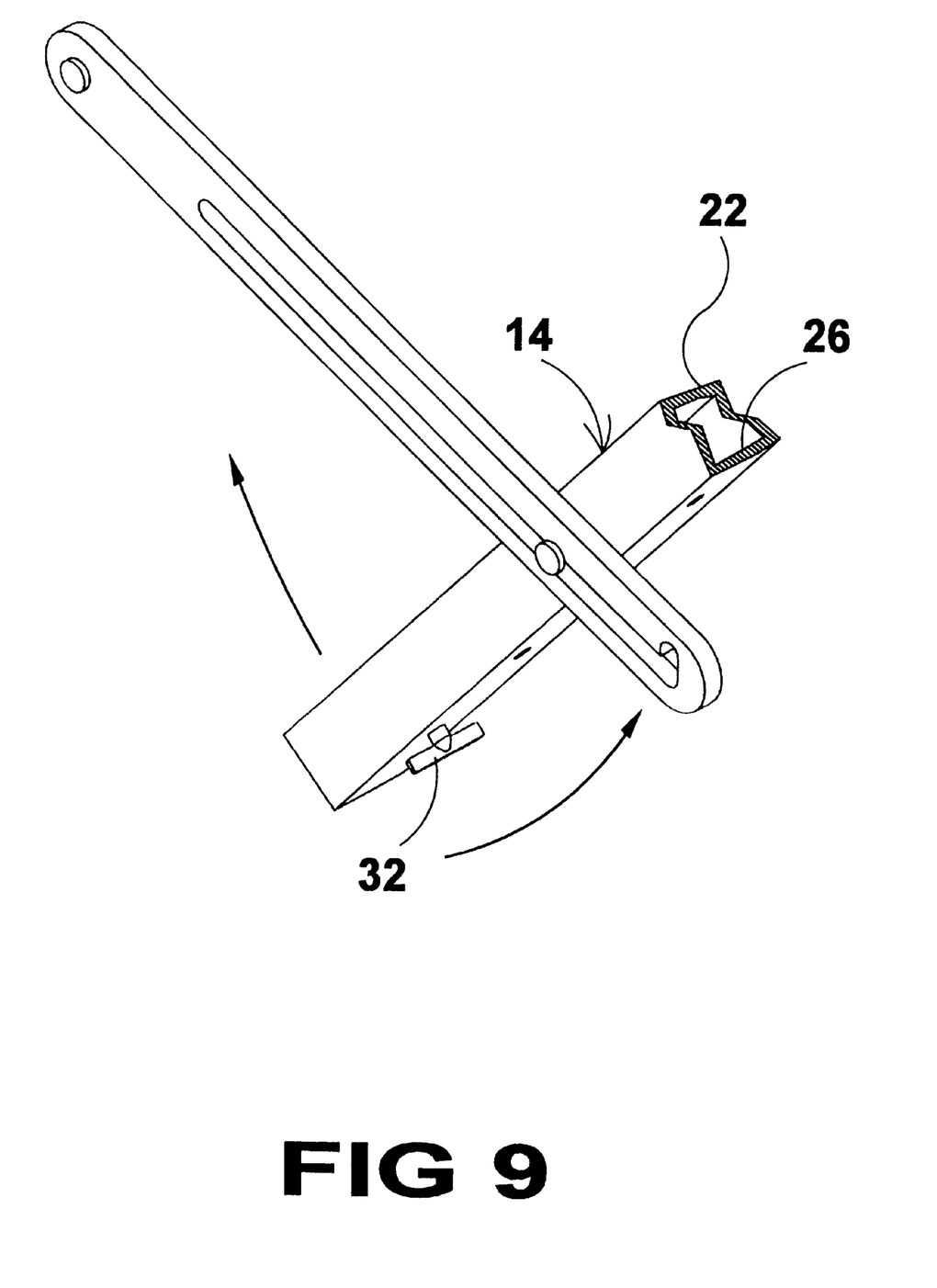
FIG. 9 is an enlarged perspective view similar to FIG. 8, showing the leg member in a partially closed position.

A hinge 44 is located across the middle of platform 12, whereby platform 12 can be folded in half into a closed position. Carrying means 16 consists of a pair of backpack straps 46, so that when platform 12 is placed into the closed position it can be carried on a back of a person. Carrying means 16 also consists of a handle 48, so that when platform 12 is placed into the closed position it can be carried by a hand of a person. The collapsible surf stand 10 can further include a removable fishing rod holder 52 mounted onto the top of platform 12, as shown in FIG. 1A. The collapsible surf stand 10 can further include a removable and height adjustable rifle holder 50 mounted onto the top of platform 12, as shown in FIG. 1B. The collapsible surf stand 10 can further include a removable camouflage assembly 54 mounted onto the top of platform 12, as shown in FIG. 1C.

The operation of the collapsible surf stand 10 will now be described. In operation, platform 12 will be placed into the opened position. The leg members 14 are then folded down to operative vertical positions. Each leg portion 24 is then adjusted to a fixed selected position with pin 32. The tapered spike ends 34 are inserted into the ground for anchoring platform 12 in a horizontal stationary position. Access panel 36 is opened and the set of stairs 40 lowered for the purposes of mounting and dismounting from platform 12. Foldable chair member 42 is extended to an operative position onto top of platform 12. Optionally, the removable and height adjustable rifle holder 50 is then mounted onto the top of platform 12. Optionally, the removable fishing rod holder 52 is then mounted onto the top of platform 12. Optionally, the removable camouflage assembly 54 is then mounted onto the top of platform 12. To carry the collapsible surf stand 10, reverse description of steps as stated above. When the collapsible surf stand 10 is in the closed position the backpack straps 36 can be used so that the collapsible surf stand 10 can be carried on the back of a person. Handle 48 can also be used when carried by a hand of a person.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A collapsible surf stand comprising:
    a) a foldable platform for supporting the weight of a person standing on said platform when in an opened position;
    b) a plurality of foldable and extendable leg members on underside of said platform;
    c) carrying means on said platform for carrying said platform when said leg members are folded to non-operative positions and said platform is in a closed position;
    d) a set of stairs pivotally mounted under said platform movable between a retracted position and an operative position where said set of stairs are lowered for use;
    e) an access panel in said platform located above said set of stairs, said panel being pivoted between a closed position flush with said platform and an open position giving access to said set of stairs; and f) a foldable chair member having a back and a seat hinged along an edge of said platform movable between a collapsed position under said platform and a position on said platform in an opened position for use, said chair member in its opened position being on the opposite side of said platform from said set of stairs.

2. A collapsible surf stand as recited in claim 1, wherein said platform includes a grate coated with a rubber material to provide a non-slip surface which can be used to stand on, especially in wet soil and low water.

3. A collapsible surf stand as recited in claim 1, wherein said platform is fabricated out of a lightweight material.

4. A collapsible surf stand as recited in claim 1, wherein each said leg member includes a retractable and extendable leg portion contained within a cavity, allowing height adjustments as well as the capability of leveling said platform on uneven ground.

5. A collapsible surf stand as recited in claim 4, further including:
   a) each said leg member having a plurality of longitudinally spaced apart apertures;
   b) each said leg portion having a plurality of longitudinally spaced apart apertures; and
   c) a pin extending through one said aperture in each said leg member and through one said aperture in each said leg portion for fixing each said leg portion of each said leg member to a selected position.

6. A collapsible surf stand as recited in claim 4, wherein each said leg portion includes a tapered spike end to provide an anchoring means for said leg member.

7. A collapsible surf stand as recited in claim 1, further including a removable fishing rod holder mounted onto the top of said platform.

8. A collapsible surf stand as recited in claim 1, further including a removable camouflage assembly mounted onto the top of said platform.

9. A collapsible surf stand as recited in claim 1, wherein said platform includes a hinge located across the middle of said platform, whereby said platform can be folded in half into a closed position.

10. A collapsible surf stand as recited in claim 9, wherein said carrying means includes a pair of backpack straps, so that when said platform is placed into said closed position it can be carried on a back of a person.

11. A collapsible surf stand as recited in claim 9, wherein said carrying means includes a handle, so that when said platform is placed into said closed position it can be carried by a hand of a person.

12. A collapsible surf stand as recited in claim 1, further including a removable and height adjustable rifle holder mounted onto the top of said platform.

* * * * *